ELEVATOR CONTROL SYSTEM

Original Filed Nov. 3, 1934 7 Sheets-Sheet 1

Note: ⊘ - Positions of brushes when car is standing at 3rd. Floor.
○ - Positions of brushes when car is at slowdown point for 3rd floor, traveling in the corresponding direction.

WITNESSES:
Fred C. Milham
C. H. Winkler

INVENTOR
Harold W. Williams
BY
H. H. Saltman
ATTORNEY

ELEVATOR CONTROL SYSTEM

Original Filed Nov. 3, 1934 7 Sheets-Sheet 2

WITNESSES:

Fred C. Williams

C. J. Mueller

INVENTOR

Harold W. Williams

BY

G. Waltman

ATTORNEY

ELEVATOR CONTROL SYSTEM

Original Filed Nov. 3, 1934 7 Sheets-Sheet 3

WITNESSES:

Fred C. Williams

C. B. Mintler

INVENTOR

Harold W. Williams

BY

W. Saltman

ATTORNEY

ELEVATOR CONTROL SYSTEM

Original Filed Nov. 3, 1934 7 Sheets-Sheet 4

WITNESSES:

Fred C. Williams

C. S. Mindler

INVENTOR

Harold W. Williams

BY

H. Walkmann

ATTORNEY

ELEVATOR CONTROL SYSTEM

Original Filed Nov. 3, 1934 7 Sheets-Sheet 5

WITNESSES:

Fred. C. Milham

C. G. Winkler

INVENTOR

Harold W. Williams

BY

ATTORNEY

ELEVATOR CONTROL SYSTEM

Original Filed Nov. 3, 1934 7 Sheets-Sheet 6

WITNESSES:
Fred. C. Milhoan
C. G. Minkler

INVENTOR
Harold W. Williams
BY
H. Waltman
ATTORNEY

Sept. 28, 1937. H. W. WILLIAMS Re. 20,524

ELEVATOR CONTROL SYSTEM

Original Filed Nov. 3, 1934 7 Sheets-Sheet 7

WITNESSES:
Fred C. Williams
C. B. Minkler

INVENTOR
Harold W. Williams
BY
G. E. Saltzman
ATTORNEY

Reissued Sept. 28, 1937

Re. 20,524

UNITED STATES PATENT OFFICE 20,524

ELEVATOR CONTROL SYSTEM

Harold W. Williams, Chicago, Ill., assignor to Westinghouse Electric Elevator Company, Chicago, Ill., a corporation of Illinois Original No. 2,064,045, dated December 15, 1936, Serial No. 751,295, November 3, 1934. Application for reissue August 11, 1937, Serial No. 158,533

16 Claims. (Cl. 187—29)

The present invention relates to elevator control systems of the type in which both the starting and stopping of the car is controlled by passenger-operated push buttons in the car and at the floor landings, and more particularly to such systems in which a number of cars are operated together as a bank of cars.

In the preferred embodiment of the present invention, the starting and stopping of the respective cars is controlled by push buttons located at the landings and in the respective cars. Each landing is provided with an up and down push button common to all of the cars. Each car is provided with a car station comprising one push button per floor, which control only the associated car.

Operation of any car button causes the associated car to start, travel to, and stop at the corresponding floor. If a number of such car buttons are operated, the car responds thereto successively. Operation of a car button also immediately lights a floor lantern at the corresponding floor. The lantern informs any intending passengers of the approach of the car, and also furnishes an indication of the direction in which the car is conditioned to leave that floor.

All cars normally stand at the lower terminal floor. Operation of any hall button starts one of the cars, the car to be started being determined by selectively operable transfer mechanism. Operation of such hall button also immediately lights a floor lantern associated with the selected elevator and located at the corresponding floor. This floor lantern informs the intending passenger which of the cars will respond to his call and enables him to proceed directly to the corresponding hatchway door.

After the selected car has started, any registered up hall calls for floors above it, or any registered down hall calls are appropriated to it, and cause the illumination at the corresponding floors of the floor lanterns for the selected car. The selected car responds to the up hall calls during its upward travel and when it reaches the highest floor for which either a hall button or one of its car buttons has been operated, it reverses, and returns to the lower terminal. During its downward movement it responds to the down hall calls appropriated to it. The system may also be arranged so that if, after answering the highest call, no further calls exist for that car, it will remain at the floor corresponding to such highest call.

Any up hall call registered, during the upward movement of the first car, for a floor which the first car has passed, or any up hall call registered after the first car has started its return movement, or any down hall call registered for a floor which the first car in its downward movement has passed, are appropriated to and cause the starting of a second car of the bank.

Any such calls also cause the immediate illumination of the hall lanterns at the corresponding floors associated with such second car, and cause the stopping of such second car at the corresponding floors, in the manner mentioned in connection with the first car.

When such second car reaches the highest floor at which a hall call appropriated to it is registered or for which one of its car buttons has been operated, it reverses and returns to the lower terminal, or, alternatively, remains at such highest floor, if no further calls are registered for that car.

If, in reversing, the second car assumes a position nearer the lower terminal than the first car, any calls previously appropriated to the first car are passed by the second car, but subsequently registered calls are appropriated to it, the corresponding lanterns being immediately illuminated. The feature of preventing one car from responding to calls previously appropriated to another car has been found desirable in that after an intending passenger has been directed to a particular hatchway by the lighting of the corresponding floor lantern, confusion results if another car stops for him.

The system is so arranged that any of the cars of the bank may be selected as the car to respond to an initial hall call. It is also arranged so that any floor may be selected as the floor to which all of the cars return when no calls are registered on the system. The normal traffic conditions in a building are usually such, however, that this floor is preferably the lower terminal floor.

In accordance with a modified embodiment of the present invention, hall buttons individual to the respective cars are located at the several floor landings and means are provided to indicate to intending passengers which of the cars of the bank is conditioned to respond to a call. This indicating means may take the form of signal lamps associated with the respective push buttons, as disclosed in the copending application of Bouton and Eames, Serial No. 688,784, filed September 9, 1933 and assigned to the Westinghouse Electric Elevator Company. Preferably, however, the signal is incorporated in the button itself.

It is an object of the present invention, accordingly, to provide a control system of the push button type for a bank of cars in which starting of the respective cars is controlled in accordance with the traffic requirements of the building.

More specifically stated, it is an object of the present invention to provide such a system in which an initial call starts a selected one of the cars, and in which additional calls start others of the cars.

It is another object of the present invention to provide such a system in which, after the starting of one of the cars, any calls in a certain zone with respect to that car are appropriated to it and in which any calls outside of such zone are appropriated to and cause the starting of a second car.

It is also an object of the present invention to provide such a system in which any car, after having been started, responds successively to any calls in the zone associated with it, and after having responded to all of such calls, returns to and remains at a selected floor.

Other objects of the present invention appear in the accompanying description and in the appended claims.

Referring to the drawings.

Figs. 3, 4, 5, 6 and 7, taken together, illustrate a control system for two cars arranged in accordance with the present invention.

Figure 8:
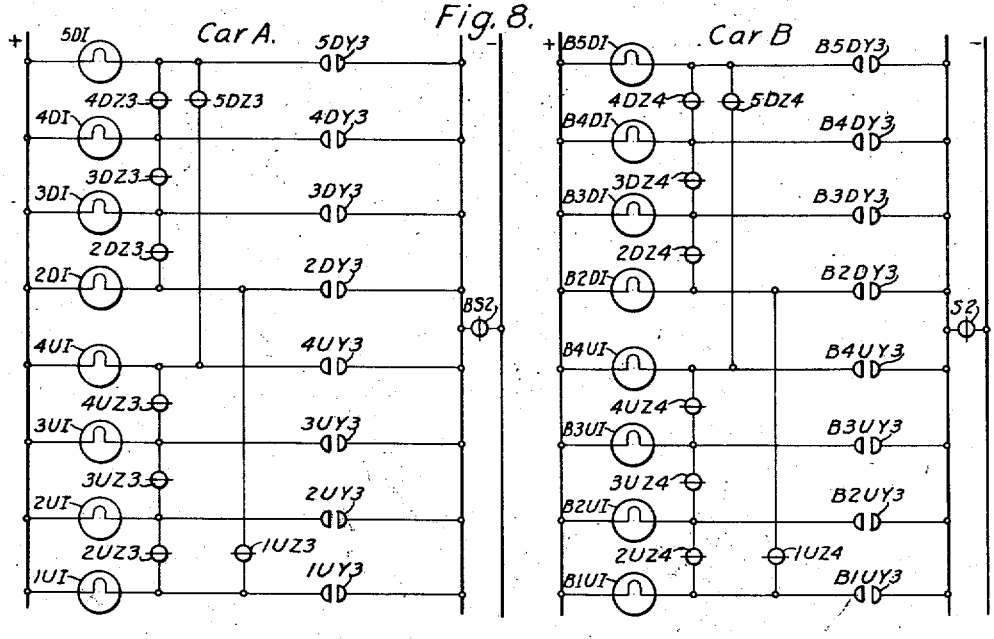
Figure 9:
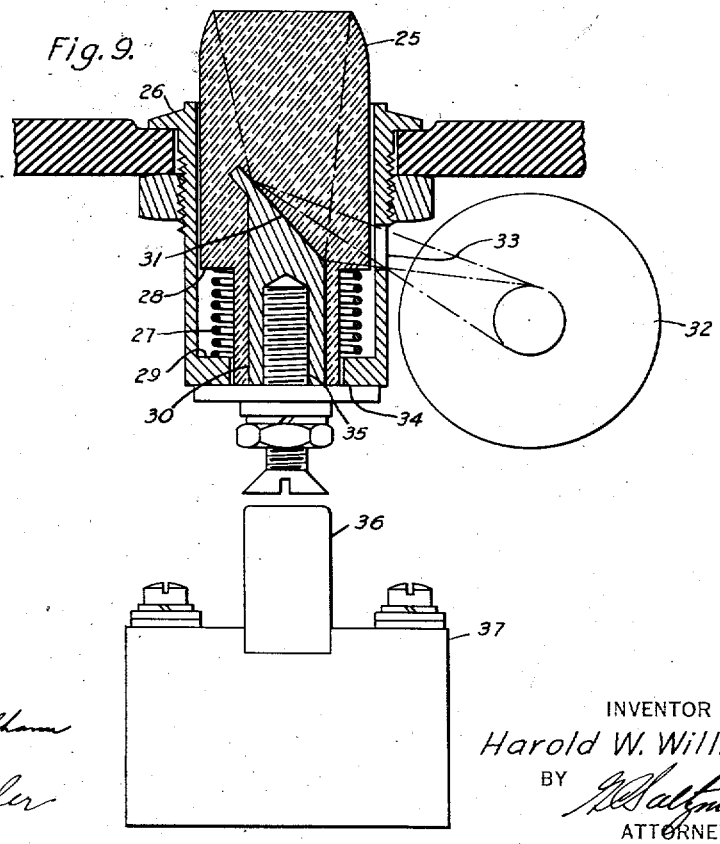

Fig. 8 shows diagrammatically the circuits for indicating to intending passengers which car of a bank is conditioned to respond to a registered call, in accordance with the second modification of the present invention, and Fig. 9 illustrates a preferred construction of a push button station incorporating an indicating element.

Except where specified in the accompanying description, the switches and relays illustrated diagrammatically in Figs. 3 through 8 are of conventional construction. Each embodies an operating electro-magnet, a movable armature disposed in the magnetic field of the electro-magnet for actuation when the coil is energized or de-energized, and one or more contact members which are opened or closed by the movements of the associated armature. The physical relationship between any coil and the contact members operated thereby is indicated by corresponding reference characters, the contacts being given an additional designating number. For example, coil 1UY operates contact members 1UY1, 1UY2, etc.

In Figs. 3 through 8, the circuits have been grouped in accordance with their functions, the grouping being indicated by brackets appearing along the right hand side of the respective sheets of drawings. Legends identifying the functions of the circuits also appear adjacent the corresponding brackets. Throughout the accompanying description, mention of a coil or contact member is accompanied by a reference to the group in which it appears.

*General description of operation*

Referring to Figs. 3 through 7, the operation in general of the preferred embodiment of the present invention and the apparatus used in the practice of it is as follows:

Each intermediate floor landing of the building is provided with a single up push button and a single down push button, and each terminal landing is provided with a single button. These buttons are shown in Groups VI and IX. The down buttons for the second, third, fourth, and fifth floors of the building are designated 2DF, 3DF, 4DF and 5DF and the up buttons for the first, second, third and fourth floors are designated 1UF, 2UF, 3UF and 4UF.

The circuits shown in Group VI are individual to car A and the circuits shown in Group IX are individual to car B. To simplify the drawings, separate up and down push buttons are shown in each group. It will be understood, however, that in the practice of the preferred embodiment of the present invention, the push buttons are so constructed that closure of any button closes the corresponding push button contacts in both of Groups VI and IX.

Operation of any hall push button registers a call on one of the cars of the bank, by completing a circuit for the actuating coil of a corresponding floor relay individual to that car. The actuating coils of the floor relays for car A are shown in Group VI, the down floor relay coils being designated 2DR, 3DR, 4DR and 5DR, and the up coils being designated 1UR, 2UR, 3UR and 4UR. The actuating coils for the floor relays for car B are shown in Group IX and are similarly designated except that they have the prefix B.

Each floor relay also includes a resetting coil, disposed to magnetically oppose the corresponding actuating coils. The resetting coils for the respective floor relays associated with cars A and B are shown immediately below the corresponding actuating coils, in Groups VI and IX, and bear the same designations.

If all the cars are standing at the same floor the car which is to be started in response to the operation of a hall button is determined by selecting-relays individual to the respective cars. The selecting relays for both cars are shown in Group II. The selecting relay for car A is designated S and that for car B as BS. When both cars are at the same floor one or the other selecting relay S or BS is energized, depending upon the position of a manual "selecting switch", and any hall calls registered under such conditions are appropriated to the car corresponding to the energized selecting relay.

Except when all of the cars are at the same floor, the car which is to respond to a registered hall call is determined by a series of zoning relays, shown in Groups I, V and VIII.

Each car of the bank is provided with an up zoning relay and a down zoning relay for each intermediate floor, an up zoning relay for the lower terminal floor and a down zoning relay for the upper terminal floor. The zoning relays individual to car A are shown in Group V and are designated, respectively, 5DY, 4DY, etc and 4UY, 3UY, etc. The zoning relays individual to car B are shown in Group VIII, and are designated B5DY, B4DY, etc., and B4UY, B3UY, etc.

The zoning relays individual to the respective cars respond to the position and direction of movement of the associated car and control a set of up and down zoning relays common to all the cars shown in Group I and designated 5DZ, 4DZ, 3UZ and 2UZ, etc.

The individual and common zoning relays function jointly to divide the hatchways into zones, determined by the relative positions and directions of movement of the respective cars. The zoning relay contacts control the circuits to the floor relays of the cars. Accordingly, operation of a hall button actuates the floor relay for the car which controls the zone in which the floor is included at the time the call is registered.

Each car is provided with a set of car buttons located within the associated car. The car buttons for cars A and B are shown in Groups VI and IX, respectively, and are designated 1C, 2C, etc. and B1C, B2C, etc. To simplify the drawings, each car button is shown in two parts, one part being in the circuit for an up floor relay and the other part being in the circuit for a down floor relay. Preferably, however, the car station includes only a single button per floor, and operation of any button closes both of the above mentioned sets of contact members. The toggle switches 2*h*, 2*i*, etc. in Group VI and B2*h*, B2*i*, etc. in Group IX selectively determine, in accordance with the position of the car with respect to a floor, whether operation of the car button for that floor shall actuate an up or a down floor relay.

Operation of a floor relay, in response to a hall or car button, as above described causes the immediate lighting of a corresponding floor lantern for that car and floor; establishes a direction preference which prevents reversal of the corresponding car until that car has reached the farthest floor in the corresponding direction of travel at which a call is registered; and causes the corresponding car to start, travel to, and stop at the corresponding floor. Upon the arrival of the car at the corresponding floor, the doors automatically open. The doors reclose after a predetermined time and as an incident to the restarting of the car, the registered call is cancelled and the lantern is extinguished.

Each car of the bank is provided with an up floor lantern and a down floor lantern for each intermediate floor and a down lantern for the upper terminal floors. Lanterns are not provided for the lower terminal floor, it being assumed that position indicators of any conventional type will be employed at the terminal floor to indicate the relative positions of the cars.

The floor lanterns for car A are shown in Group VI, and are designated, respectively, 5DL, 3DL, 4UL, etc. The floor lanterns for car B are shown in Group IX and are similarly designated except that they have a prefix "B".

The circuits for establishing a direction preference for car A and for controlling the starting and stopping thereof are shown in Group IV, and comprise an up-direction-preference-relay N, a down-direction-preference-relay O, and stopping relays M and P. The corresponding direction preference circuits for car B are shown in Group VII, each relay designation having a prefix "B". The circuits directly concerned with the opening and closing of the doors and the starting and stopping of the hoisting motors for cars A and B are shown in Group III.

The motor control systems of the respective cars form no part of the present invention and may be of any selected type. They are illustrated, however, as being of the Ward-Leonard type comprising, for cars A and B, respectively, direct-current generators 10 and 10B directly connected to motors 11 and 11B. The direction and speed of operation of the motors are determined by the polarity and degree of excitation of separately excited field windings 12 and 12B on the generators.

In the illustrated embodiment, the slowing down and stopping of the car is directly controlled by switches of the type illustrated in Patent No. 1,902,602, granted to Williams et al. March 21, 1933 and assigned to the Westinghouse Electric & Manufacturing Company. As there described, each switch comprises an electromagnet, an armature and contact structure mounted on the car, and magnetizable plates mounted in the hatchway. The arrangement is such that energization of the electromagnet has no effect on the armature other than to condition the switch for actuation in response to the magnetic pull between the armature and the plate when the car reaches the corresponding point in the hatchway. The magnetic circuit is such, however, that after having been actuated in this manner, the armature remains in the actuated position until the electromagnet is deenergized.

Figure 1:
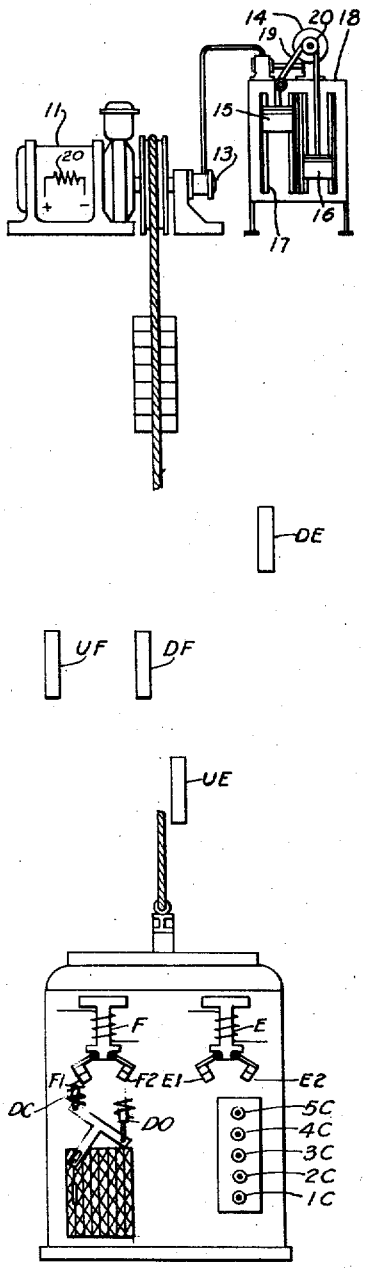
Figure 1 is a view showing the mechanical relationship of certain parts of the system.

Each car is provided with a slow-down inductor switch and a stopping inductor switch, the general arrangement of which is shown in Fig. 1. Referring to Fig. 1, slow-down switch E and stopping switch F, associated with car A, are mounted upon the elevator car. Slow-down switch E is provided with up contact members E1 and down contact members E2. A plate UE is mounted in the hatchway in position to be brought opposite and actuate the armature associated with contact members E1 when the car reaches the slow-down point for the corresponding floor travelling in the up direction. A plate DE is mounted in the hatchway in position to be brought opposite and actuate the armature associated with contact members E2 when the car reaches the slow-down point for the corresponding floor travelling in the down direction.

Stopping switch F is similarly provided with up and down contact members F1 and F2, respectively. Plates UF and DF are mounted in the hatchway in position, respectively, to actuate the contact members F1 and F2 just prior to the arrival of the car at the corresponding floor when travelling in the up or down direction, respectively. Although only one complete set of inductor plates has been illustrated, it will be understood that each intermediate floor is provided with sets of up and down plates, the lower terminal floor is provided with a set of down plates, and the upper terminal floor is provided with a set of up plates.

The door opening and closing mechanisms for the respective cars form no part of the present invention and to simplify the drawings, have not been completely illustrated. A door closing relay DC and a door opening relay DO for car A and corresponding relays BDC and BDO for car B are shown in Group III. It is to be understood that energization of a door opening relay causes the opening of the hatchway door at the floor at which the car is positioned, and that energization of a door closing relay causes the closing of the hatchway door at the floor at which the car is positioned.

Figure 2:
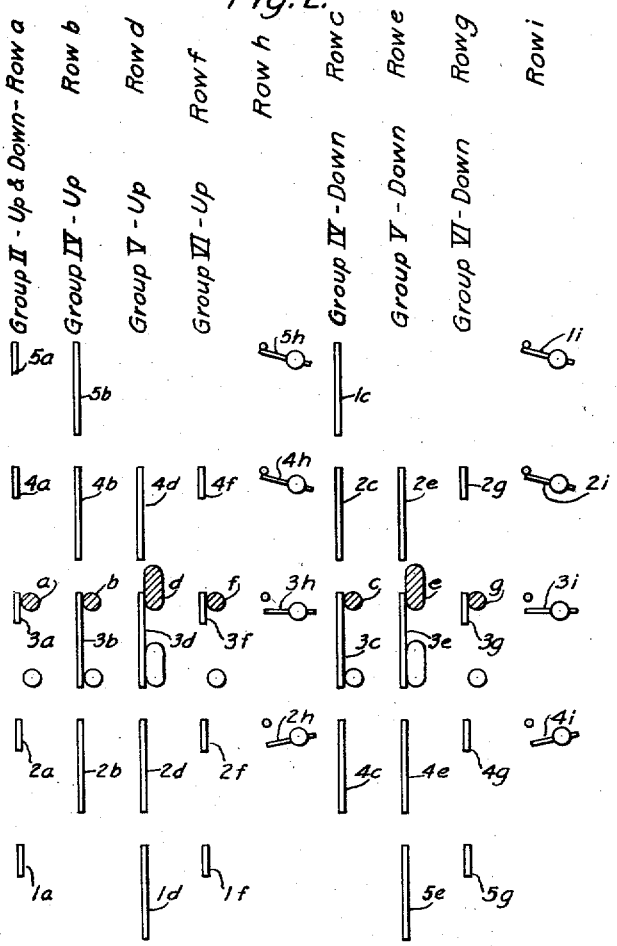
Fig. 2 is a view showing the relative positions, corresponding to different positions of a car in its hatchway, of floor selector elements which may be used in connection with the present invention.

The circuits for the respective cars which are associated with the individual floors of the building are commutated by means of floor selectors individual to the cars. The floor selecting apparatus for car A is shown generally in Fig. 1 and the relative positions of the parts thereof for different car positions are shown in Fig. 2. The corresponding apparatus for car B is identical.

Referring to Fig. 1, the driving mechanism for the floor selector associated with car A comprises a telemotor transmitter 13, preferably of the self-synchronizing type, which is directly connected to the shaft of elevator motor 11.

Transmitter 13 is electrically connected with a telemotor receiver 14 of the same type, in a well known manner, so that any rotation of the armature of transmitter 13 produces a proportional rotation in the corresponding direction of the armature of receiver 14.

Receiver 14 drives the brush carriages 15 and 16, which are secured by means of suitable guide rails 17 upon a vertically mounted base panel 18. The brush carriages 15 and 16 are mechanically connected by a chain 19 which passes over and is driven by a sprocket 20. Sprocket 20 is connected to receiver 14 through suitable reducing gearing.

Although either brush carriage 15 or 16 may move upward in response to an upward movement of the car, it is assumed that the telemotor connections are such that brush carriage 15 moves upwardly during upward movement of the car. It is also assumed that it covers its entire path of travel from top to bottom of floor selector panel 18 while the car is moving from its lower terminal limit to its upper terminal limit.

Brush carriages 15 and 16 each supports a number of conducting brushes disposed to engage and disengage groups of conducting segments mounted upon panel 18. The rows of segments and brushes are shown in relation to their associated circuits in Figs. 3, 4 and 5. Figure 2 shows, for car A, the positions of the several brushes with respect to the segments for various positions of the car.

Referring to Figure 2 the segments in row "*a*" control the selecting relays S and BS, the circuits for which are shown in Group II. Row "*a*" includes one segment per floor designated respectively 1*a*, 2*a*, 3*a*, 4*a* and 5*a*, disposed for engagement by a brush "*a*" on carriage 15. Brush *a* is in engagement with a particular segment while the car is in a zone extending a short distance on either side of the corresponding floor.

The segments in rows *b* and *c* control the initiation of stopping during upward and downward movement of car A, respectively. Row *b* includes a segment for each of the second, third, fourth and fifth floors, designated 2*b*, 3*b*, etc., disposed for engagement by a brush *b* on carriage 15. Row *c* includes a segment for each of the first, second, third and fourth floors, designated 1*c*, 2*c*, etc., and disposed for engagement by a brush *c* on carriage 16. Brushes *b* and *c* engage a particular segment when the car reaches the slow-down point for the corresponding floor, travelling in the corresponding direction, and remain in engagement therewith until the car leaves the corresponding floor travelling in the corresponding direction.

The segments in rows *d* and *e* control the up and down zoning relays individual to car A, respectively, the circuits for which are shown in Group V. Row *d* includes a segment for each of the first, second, third and fourth floors designated 1*d*, 2*d*, etc., and row *e* includes a segment for each of the second, third, fourth and fifth floors designated 2*e*, 3*e*, etc. These segments are disposed for engagement respectively by brushes *d* carried upon carriage 15, and *e* carried upon carriage 16. Brushes *d* and *e* engage an associated segment when the car is at the corresponding floor and engage the segment for the next floor just after the car leaves such floor in the corresponding direction. The dimensions of brushes *d* and *e* are such that they momentarily engage two segments at the same time.

The brushes and segments in rows *f* and *g* respectively control the cancellation of registered calls, the circuits for which are shown in Group VI. Row *f* includes a segment for each of the first, second, third and fourth floors designated respectively 1*f*, 2*f*, 3*f*, and 4*f*, disposed for engagement by a brush *f* on brush carriage 15. Row *g* includes a segment for each of the second, third, fourth and fifth floors, designated 1*g*, 2*g*, 3*g* and 4*g*, disposed for engagement by a brush *g* on brush carriage 16. As shown, brushes *f* and *g* engage a segment after the car has passed the slow-down point for the corresponding floor travelling in the corresponding direction, and remain in engagement with that segment until just after the car leaves that floor in the corresponding direction.

The elements in rows *h* and *i* are switches of the toggle type, mounted on panel 18. Row *h* includes a toggle switch for each of the second, third, fourth and fifth floors designated 2*h*, 3*h*, etc., and row *i* includes a toggle switch for each of the first, second, third and fourth floors designated 2*i*, 3*i*, etc. The toggle switches of rows *h* and *i* are disposed for actuation by cams carried on carriages 15 and 16, respectively. The switches in row *h* are closed except when the car is at or above the corresponding floor. The switches in row *i* are closed except when the car is at or below the corresponding floor. These toggle switches are associated with the circuits for the car buttons, shown in Group VI, and serve to determine whether operation of a car button shall actuate an up floor relay or a down floor relay for the associated car.

*Detailed description of operation*

The various relays and switches shown in the drawings individual to car A, or common to both cars A and B are identified as follows. The control system for car B is a duplicate of that for car A, and the relays and switches are in each case given an additional identifying reference character B:

*Individual to car A*

| | |
|---|---|
| 5DY, 4DY, 3DY, 2DY | Down individual zoning relays |
| 4UY, 3UY, 2UY, 1UY | Up individual zoning relays |

S—Selecting relay
U—Up reversing switch
D—Down reversing switch
I—Speed switch
K—Brake magnet
H—Auxiliary control relay
E—Slowdown inductor switch
F—Stopping inductor switch
G—Gate relay
T—Time relay
Q—Starting relay
DC—Door closing relay
DO—Door opening relay
M—Up stopping relay
P—Down stopping relay
N—Up direction preference relay
O—Down direction preference relay

*Individual to car A* (continued)

| | |
|---|---|
| 5DR, 4DR, 3DR, 2DR | Down floor relays |
| 4UR, 3UR, 2UR, 1UR | Up floor relays |

*Common to cars A and B*

| | |
|---|---|
| 5DZ, 4DZ, 3DZ, 2DZ | Down common zoning relays |
| 4UZ, 3UZ, 2UZ, 1UZ | Up common zoning relays |

*Detailed description of operation*

As previously mentioned, in the preferred embodiment of the present invention, all of the cars normally remain at the lower terminal floor. As long as the cars remain at this floor, with no calls for service registered at any of the floors, or on the car buttons in any of the cars, up and down direction preference relays N and O for car A and BN and BO for car B, individual zoning relay 1UY for car A and B1UY for car B, common zoning relay 1UZ and door opening relays DO and BDO for cars A and B, respectively, are energized. Dependent upon the position of the manual selecting switch in Group II, either selecting relay S for car A or BS for car B is energized to condition the corresponding car to respond to hall calls.

The circuits for relays N and O of car A are shown in Group IV and are as follows: From the plus line, through coil N, in series through the now closed back contact members 5DR2, 5DR3, 4UR2, 4UR3, 4DR2, 4UR3, 3UR2, 3UR3, 3DR2, 3DR3, 2UR2, 2UR3, 2UR2, 2DR3, 1UR2, segment 1*c*, and brush *c*, and now closed contact members U9 to minus. The circuit for relay O extends from plus through coil O, normally closed contact member 1UR3, segment 1*c*, brush *c*, and through normally closed contact member U9 to minus. The circuits for direction preference relays BN and BO, car B, are identical with those just traced and are shown in Group VII.

Up direction preference relay N, upon being operated, opens its contact members N1, N2 and N3, and closes its contact members N4 and N5. The opening of contacts N2, opens one of two parallel circuits for the coil of relay Q in Group III, but the operation of the other contact members is without effect at this time. Up direction preference relay BN, car B, upon being operated, operates corresponding contacts, with corresponding effect.

Down direction preference relay O, upon being operated, opens contact members O1, O2 and O3 and closes contact members O4 and O5. The operation of contacts O1, O3 and O4 is without effect at this time. The opening of contacts O2 interrupt the second of the two parallel circuits for relay Q, in Group III, maintaining the latter relay deenergized. Closure of contact members O5 completes a circuit for the coil of first floor up individual zoning relay 1UY, as shown in Group V. Direction preference relay BO, upon being operated, closes corresponding contacts, with corresponding effect.

Relays 1UY and B1UY, upon being operated, close contact members 1UY1 and 1UY2, and B1UY1 and B1UY2, respectively. These contact members complete two parallel circuits for first floor common zoning relay 1UZ, as shown in Group I. Relay 1UZ in operating opens its contact members 1UZ1, Group VI, the effect of which will be described later.

Contact members 1UY2 and B1UY2, in closing, condition the associated cars to respond to hall calls. These contact members are shown respectively in Groups VI and IX.

Figure 3:
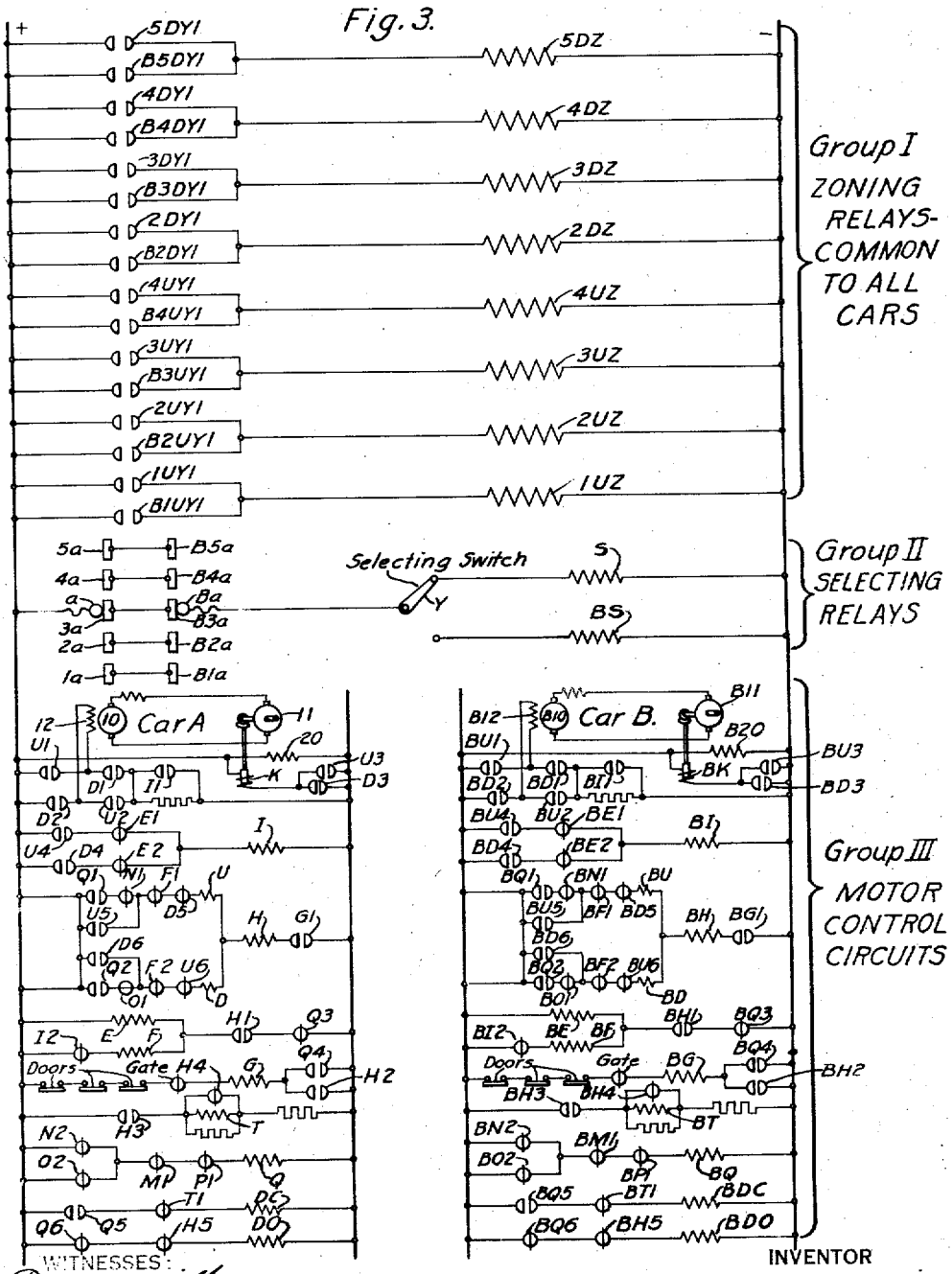
Figure 4:
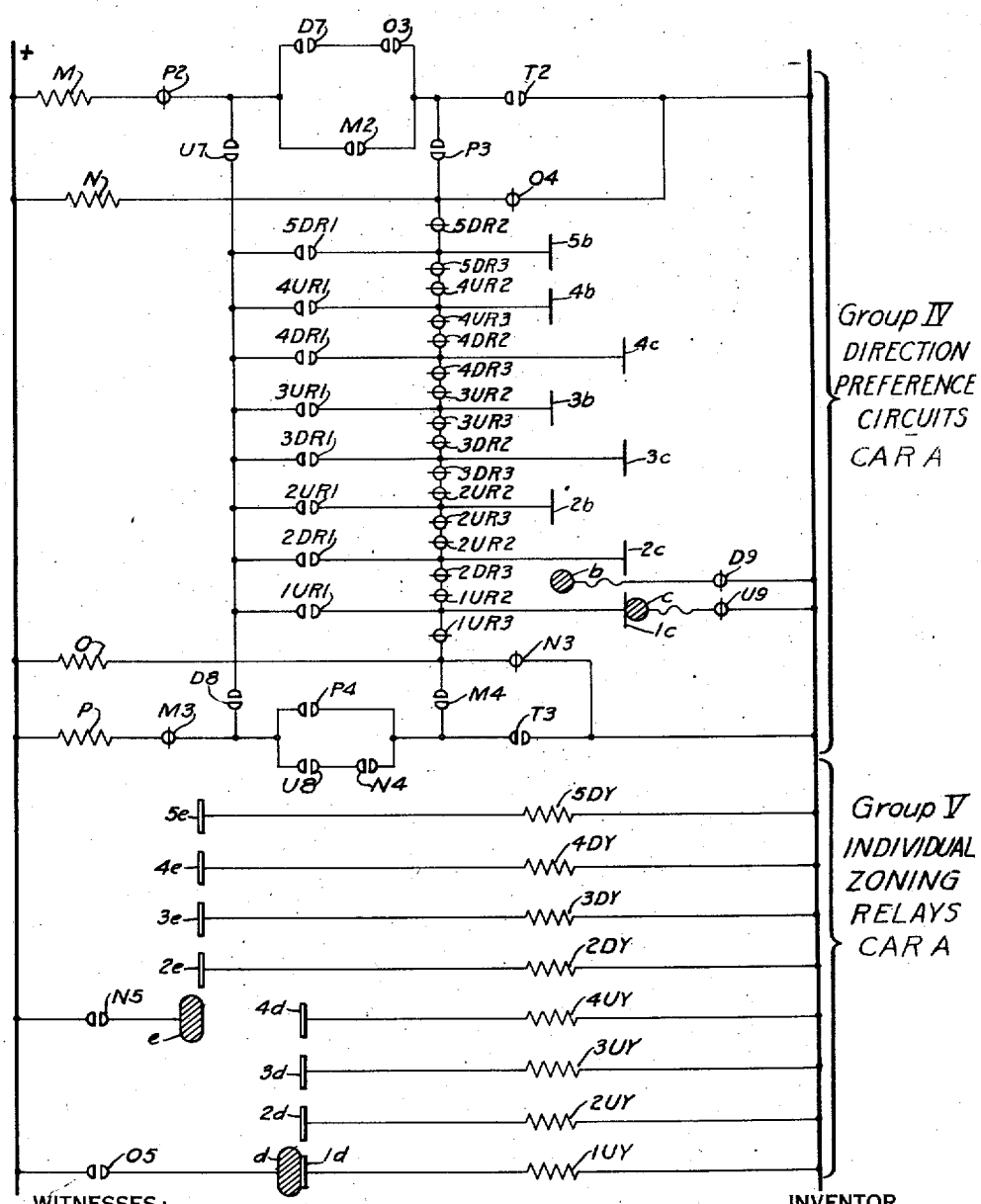
Figure 5:
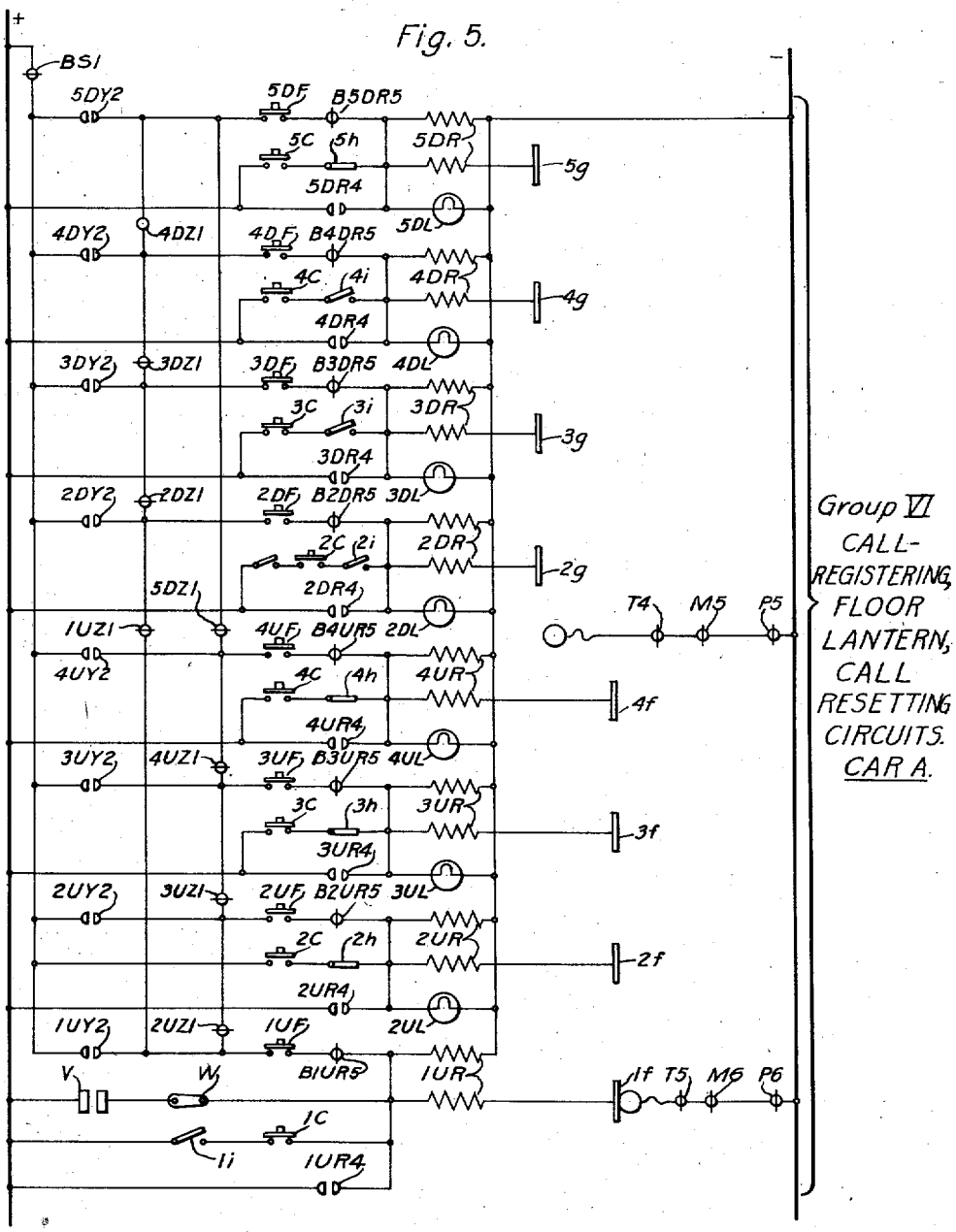
Figure 6:
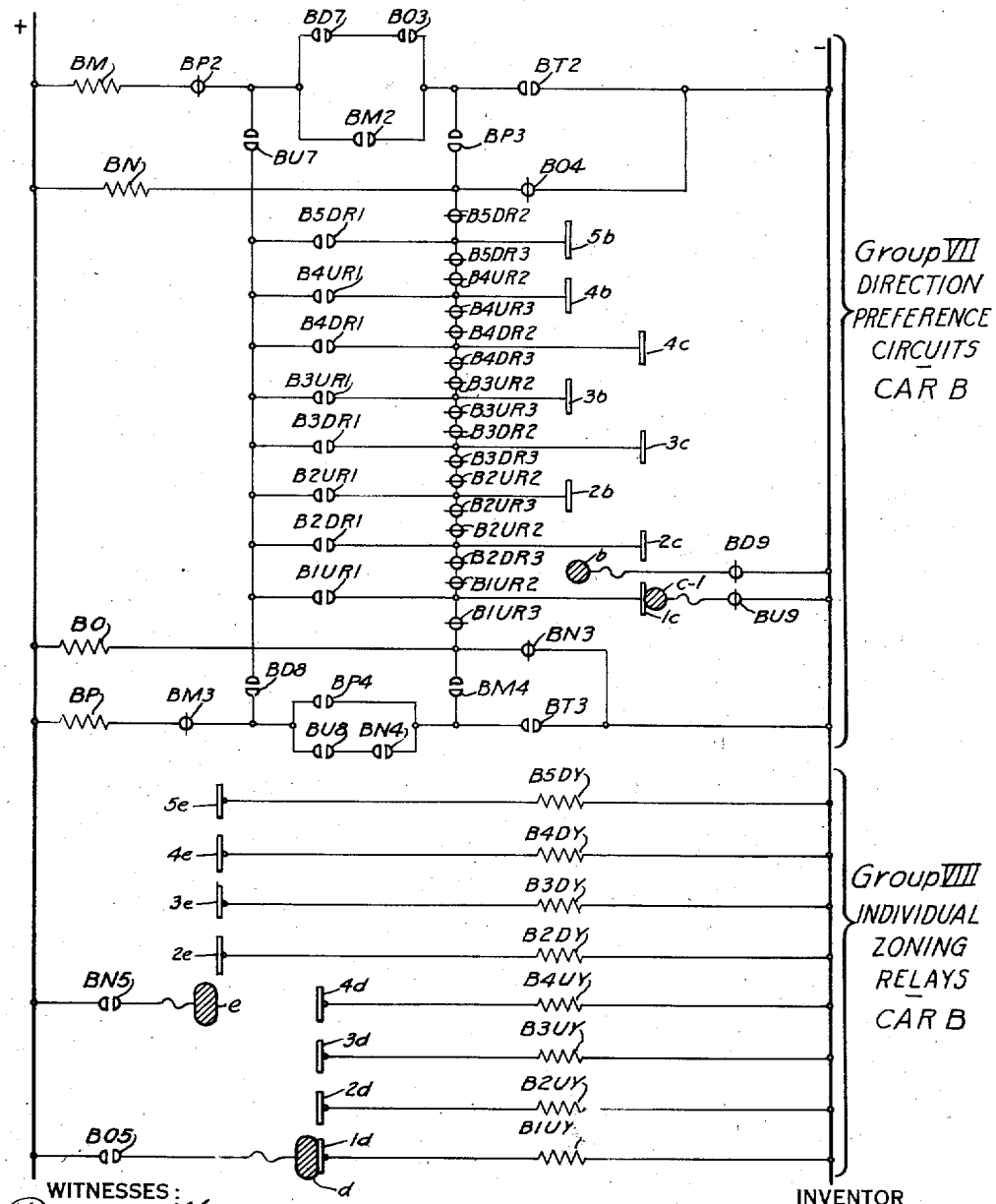
Figure 7:
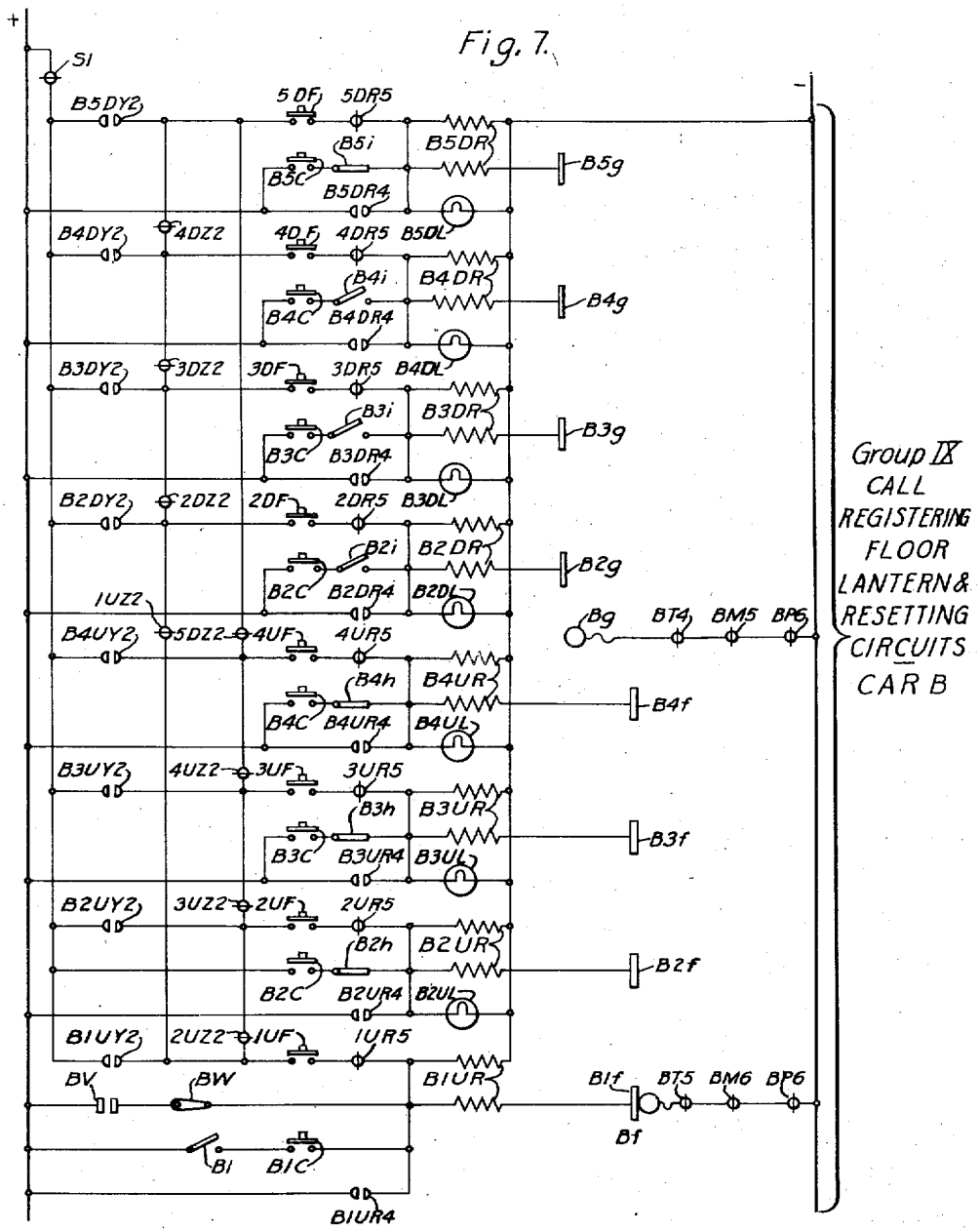

In the position illustrated in Fig. 3, the manual selecting switch Y completes the circuit for selecting relay S associated with car A, the circuit for which includes brush *a*, segment 1*a*, segment B1*a*, and brush B*a*. This circuit is completed since both cars are standing at the same floor, in this case the first floor.

Selecting relay S in operating opens its contact members S1. These contact members are shown at the top of Group IX, and serve to prevent response to hall calls by the floor relays associated with car B.

The circuit for the door opening relay DO is shown in Group III and includes now closed contact members Q6 and H5. The circuit for door opening relay BDO associated with car B is also shown in Group III, and is identical with the circuit just traced. As previously mentioned, door opening relays DO and BDO serve to hold open the first floor hatchway doors and car gates of cars A and B, as long as these relays remain energized.

*Up call registered at third floor*

Assuming an intending passenger at the third floor wishes to travel upwardly, up third floor hall button 3UF is closed, causing car A to start, travel to, and stop at the third floor.

Closure of button 3UF completes a circuit in Group VI for the up third floor relay coil 3UR for car A. This circuit extends from plus through contact members BS1, 1UY2, 2UZ1 and 3UZ1, push button contacts 3UF, contact members B3UR5, and coil 3UR, to minus. Closure of associated push button contacts 3UF in Group IX does not complete a corresponding circuit for up third floor relay B3UF for car B, since, as previously mentioned, contact members S1 are open.

Up third floor relay 3UR, upon being operated, closes contact members 3UR1 and 3UR4, and 3U*d*—1, and opens contact members 3UR2, 3UR3 and 3UR5. Contact members 3UR1 prepare a circuit, in Group IV, which later results in initiating the slowdown of the car. Contact members 3UR4 complete a self-holding circuit (Group VI) for coil 3UR and a parallel circuit for up third floor lantern 3UL. This circuit remains complete until the car has stopped at, and restarted from the third floor. The lighting of the third floor lantern 3UL informs the intending passenger that his call has been registered and will be responded to by car A.

The opening of contact members 3UR5, in Group IX, serves to prevent energization of coil B3UR, in response to subsequent closures of push button 3UF.

The opening of contact members 3UR2 and 3UR3 interrupts the previously traced circuit, in Group IV, for direction preference relay O. Contact members O1, O2 and O3 accordingly reclose, and contact members O4 and O5 reopen. Reclosure of contact members O3 and reopening of contact members O4 and O5 is without immediate effect.

Reclosure of contact members O1, in Group III, prepares a circuit for the coil of up-reversing switch U. Reclosure of contact members O2, in Group III, completes a circuit for the coil of starting relay Q, contact members M1 and P1 being closed at this time.

Relay Q, upon being operated closes contact members Q1, Q2, Q4 and Q5 and opens contact members Q3 and Q6, all of which are shown in Group III. Closure of contact members Q2 is without immediate effect. Closure of contact members Q1 further prepares the circuit for the coil of up reversing switch U. Opening of contact members Q3 prevents energization of the coils of slowdown and stopping switches E and F, except when car A approaches a floor at which a call is registered, as later described.

Closure of contact members Q5 completes a circuit for the coil of door-closing relay DC, and opening of contact members Q6 interrupts the circuit for the coil of door-opening relay DO. Accordingly, the first floor hatchway door and car gate for car A start to close. As soon as the door is closed, the interlocks designated "doors and gates" in Group III close, completing a circuit for the coil of interlock relay G, since contact members Q4 are now closed.

Upon being operated, interlock relay G closes contact members G1 (Group III), completing a circuit for the coils of up-reversing switch U and auxiliary relay H.

Up-reversing switch U, upon being operated, closes contact members U1, U2, U3, U4 and U5 opens contact members U6 (all in Group III), and closes contact members U7, and U8, and opens contact member U9 (all in Group IV).

Closure of contact members U1 and U2 (Group III) completes a circuit for the separately excited field winding 12 of generator 10 resulting in applying a relatively low voltage to the armature of motor 11.

Closure of contact members U3 completes a circuit for the coil K of the electromagnetically-released, spring-applied brake. The field winding 20 of motor 11 is continuously excited. Accordingly, upon the release of the brake and completion of the generator field circuit just mentioned, motor 11 starts car A upwardly at low speed.

Closure of contact members U4 completes a circuit for the coil of accelerating switch I, as shown in Group III. Switch I, upon being operated, closes contact members I1 and opens contact members I2. Closure of contact members I1 short circuits an accelerating resistor in the circuit of generator field 12 (Group III), which accelerates motor 11 to full speed. The opening of contact members I2 prevents energization of the coil of stopping switch F, while car A travels at high speed.

Closure of contact members U5 completes a self-holding circuit for the coils of relays U and H (Group III). The opening of contact members U6 prevents completion of the circuit for down reversing switch D. Closure of contact members U7 prepares a circuit in Group IV for the coil of up stopping relay M. Closure of contact members U8 in Group IV is without effect, since the car is assumed to be travelling upwardly in response to an up call. The opening of contact members U9 disconnects brush *c* in Group IV.

Relay H, upon being operated, closes contact members H1, H2 and H3 and opens contact members H4 and H5, all of which are shown in Group III. Closure of contact members H1 prepares a circuit for the coils of slowdown and stopping switches E and F. Closure of contact members H2 completes an auxiliary holding circuit for the coil of interlock relay G. Closure of contact members H3 and opening of contact members H4 energizes the coil of time relay T, causing this relay to operate. The opening of contact members H5 is without effect, since the coil of the door opening relay has been previously deenergized.

Relay T, upon being operated, opens contact members T1 in Group III, closes contact members T2 and T3 in Group IV and opens contact members T4 and T5 in Group VI.

The opening of contact members T1 in Group III deenergizes the coil of door closing relay DC. This operation is without effect at this time, since, as previously mentioned, door closing relay DC has already closed the first floor door and car gate.

Closure of contact members T2 and T3 in Group IV prepares circuits for up and down stopping relays M and P, but is without effect at this time.

The opening of contact members T4 and T5 in Group VI disconnects the floor selector brushes *g* and *f*. These contacts prevent cancellation of calls except when the car stops at the corresponding floor.

As car A leaves the first floor, brush *a* disengages segment 1*a* in Group II, deenergizing selecting relay S, contact members S1 of which accordingly reclose. The reclosure of these contact members enables registration of hall calls for car B. As will be more fully described, the common zoning relays 1UZ, etc., and the individual zoning relays 1UY and B1UY determine the floors for which registered hall calls will be appropriated to car B in accordance with the relative positions of cars A and B.

As previously mentioned, brush *d* engages segment 2*d* in Group V just after the car leaves the first floor thereby completing a circuit for individual zoning relay 2UY. Shortly thereafter it disengages segment 1*d*, interrupting the circuit for individual zoning relay 1UY. The opening of contact members 1UY1 in Group I is without effect, since contact members B1UY1 associated with car B are still closed. The opening of contact 1UY2 in Group VI, jointly with contacts 2UZ1, prevents registration on car A of a first floor hall call as long as car B remains at the first floor. This will be described more fully later.

Closure of contact members 2UY1 completes a circuit for zoning relay 2UZ in Group I, and closure of contact members 2UY2 in Group VI connects up hall button 2UF directly to the plus line.

Zoning relay 2UZ in operating opens contact members 2UZ1 in Group VI and 2UZ2 in Group IX. The opening of contact members 2UZ1 prevents receipt by car A of an up hall call for the first floor. The opening of contact members 2UZ2 prevents receipt by car B of hall calls for any floors in advance of car A.

In accordance with the preferred embodiment, after all calls are answered, all cars return to and park at the lower terminal floor. The departure of any car from the lower terminal floor registers a call on that car for such lower terminal. For convenience the registration of this call is illustrated as occurring when the car approaches the second floor. Referring to Group VI hatchway switch V is momentarily closed when car A approaches the second floor completing a circuit for actuating coil 1UF of the first floor relay for car A.

Floor relay 1UR upon being operated closes contact members 1UR4 in Group VI, completing a self-holding circuit for coil 1UR; opens contact members 1UR2 and 1UR3 and closes contact members 1UR1 in Group IV; and opens contact members 1UR5 in Group IX. The operation of contact members 1UR1, 1UR2 and 1UR3 is without effect. The opening of contact members 1UR5 prevents registration, by button 1UF, of a first floor hall call on car B.

As car A approaches the slowdown point for the third floor, brush *b* engages segment 3*b*, completing a circuit for stopping relay M. This circuit includes contact members P2, U7 and 3UR1, segment 3*b*, brush *b*, and interlock contact members D9, which are closed since the car is travelling upwardly.

Stopping relay M, upon being operated, opens contact members M1 in Group III, closes contact members M2 and M4, and opens contact members M3 in Group IV, and opens contact members M5 and M6 in Group VI. The opening of contact members M1 in Group III deenergizes control relay Q, which transfers the stopping operation to the inductor switches E and F, as will be described.

Closure of contact members M2 completes a self-holding circuit for coil M, which remains complete until the opening of contact members T2, which occurs a predetermined time after car A stops.

Operation of contact members M3 and M4 is without effect, since, in this instance, response is being made to an up call during up travel. The opening of contact members M5 and M6 in Group VI is without immediate effect. These contact members are concerned with the cancelling of calls and their effect will be described later.

Upon being deenergized, starting relay Q reopens contact members Q1, Q2 and Q4 and recloses contact members Q3 and Q6 in Group III. The opening of contact members Q1, Q2 and Q4 is without effect. Reclosure of contact members Q6 prepares a circuit for the door opening relay DO. Reclosure of contact members Q3 completes a circuit for the coil of slowdown switch E. As previously mentioned, energization of the coil of this switch does not result in immediate operation thereof. When, however, as shown in Fig. 1, switch E is brought opposite an up magnetic plate EU, contact members E1 are actuated to the open position, interrupting the circuit in Group III for accelerating switch I, which accordingly reopens contact members I1 and recloses contact members I2.

The opening of contact members I1 includes a resistor in the circuit of generator field winding I2 decelerating the car. Closure of contact members V*b*—1 completes a circuit in Group III for the coil of stopping switch F.

As the car approaches the third floor and brings stopping switch F opposite an up magnetic plate FU, contact members F1 in Group III are opened, deenergizing up-reversing switch U and auxiliary relay H.

Upon being deenergized, reversing switch U reopens contact members U1, U2, U3, U4 and U5 and recloses contact members U6 all in Group III; and opens contact members U7 and U8, and recloses contact members U9 in Group IV.

The opening of contact members U1, U2 and U3 deenergizes field winding I2 and applies brake K in Group III, thereby stopping the car at the third floor.

The opening of contact members U4 and U5 and closure of contact members U6 is without effect, since the associated circuits are already opened.

The opening of contact members U7 and U8 in Group IV is without effect, since a self-holding circuit has been completed for switch M, and since the circuit for switch P is interrupted elsewhere. The closure of contact members U9 in Group IV has no effect other than to connect brush *c* to the negative side of the line.

Upon being deenergized, control relay H opens contact members H1, H2 and H3, and recloses contact members H4 and H5, all in Group III.

The opening of contact members H1 deenergizes the coils of slowdown and stopping switches E and F, the contact members of which reclose, without effect.

The opening of contact members H2 deenergizes interlock relay G, contact members G1 (Group III) of which accordingly reopen without immediate effect, since switches U and H have been previously deenergized.

The opening of contact members H3 interrupts the circuit for the coil of time relay T, and the reclosure of contact members H4 completes a low resistance discharge path for the energy stored in this coil, to delay the opening movement thereof. (Group III.)

The reclosure of contact members H5 in Group III completes a circuit for the coil of door opening relay DO, in response to which the car gate and a third floor hatchway door for car A are moved to the open position. It is noted that this circuit remains complete until the car restarts. Thus, the door and gate will remain open as long as the car remains at the third floor.

After a predetermined time, preferably of the order of from 6 to 10 seconds, relay T times out, reclosing contact members T1 in Group III, reopening contact members T2 and T3 in Group IV, and reclosing contact members T4 and T5 in Group VI.

The reclosure of contact members T1 in Group III prepares a circuit for door closing relay DC. It is to be noted that these contact members prevent reclosure of the doors for a predetermined time after the car stops at a floor, even though other calls are registered on the system which tend to start the car.

The opening of contact members T2, in Group IV, deenergizes the coil of stopping relay M, which thereupon recloses contact members M1, Group III, reopens contact members M2 and M4 and closes contact members M3 in Group IV, and recloses contact members M5 in Group VI. The opening of contact members T3, in Group IV, is without effect.

The operation of the contact members M1, M2, M3 and M4 is without effect, but the reclosure of contact members M5 in Group VI, together with a reclosure of contact members T4, completes a circuit for the resetting coil of up third floor relay 3UR.

It is noted that contacts T5, M6 and P6 complete a corresponding resetting circuit for the up 3rd floor relay 3UR, which is without effect at this time, since no 3rd floor up call was assumed. With this arrangement if both up and down relays for a floor are operated, the stopping of a car at that floor resets both relays.

Upon completion of this circuit the resetting coil magnetically opposes the actuating coil of relay 3UR, restoring this relay to the deenergized position. This opens contact members 3UR4 in Group VI, recloses contact members 3UR2 and 3UR3 and reopens contact members 3UR1 in Group IV, and recloses contact members 3UR5 in Group IX.

The opening of contact members 3UR1 in Group IV is without effect. Reclosure of contact members 3UR2 completes a circuit for direction preference relay N, which includes segment 3*b*, brush *b*, and the normally closed contact members of the floor relays. Reclosure of contacts 3UR3 in Group IV has no effect. The opening of contact members 3UR4 in Group VI interrupts the circuit for, and extinguishes, up floor lantern 3UL. The opening of contact members 3UR5 in Group IX is without effect at this time.

Direction preference relay N, upon being energized, opens contact members N1 and N2 in Group III, opens contact members N3 and closes contact members N4 in Group IV, and closes contact members N5 in Group V.

The opening of contact members N2 in Group III prevents completion of a circuit for control relay Q. The opening of contact members N4 in Group IV is without effect.

Closure of contact members N5 in Group V completes a circuit for the coil of third floor individual zoning relay 3DY, which closes contact members 3DY1 in Group I to thereby energize zoning relay 3DZ, and closes contact members 3DY2 in Group VI, to prepare the floor relay circuits of car A.

The opening of contact members N3 in Group IV interrupts the circuit for direction preference relay O, which accordingly recloses contact members O1 and O2 in Group III, opens contact members O3 and recloses contact members O4 in Group IV, and recloses contact members O5 in Group V.

The operation of contact members O3 and O4 in Group IV is without effect. Contact members O5 are concerned with the zoning relays, Group V, described more in detail later.

Reclosure of contact members O1 in Group III is without effect, other than to prepare a circuit for the coil of down reversing switch D and auxiliary relay H. Reclosure of contact members O2 in Group III completes a circuit for the coil of control relay Q.

Upon completion of this circuit, relay Q functions to cause closing of the doors, and the starting and accelerating of the car to full speed in the manner previously described, except that in this case down reversing switch D is actuated instead of up reversing switch U. Down-reversing switch D excites the generator field 12 in a direction opposite to that caused by up reversing switch U. In all other respects, the action of the several contact members of down reversing switch D is analogous to the described effect of the contact members of up reversing switch U. It is believed unnecessary, therefore, to describe in detail the operation of starting and accelerating the car to full speed in the down direction.

As the car approaches the first floor, brush *c* engages segment 1*c*, completing a circuit for down stopping relay P which includes contact members M3, D8 and 1UR1, segment 1*c*, brush *c*, and now closed contact members U9.

Upon being operated, down stopping relay P opens contact members P1, Group III, opens contact members P2 and closes contact members P3 and P4, Group IV, and opens contact members P5, Group VI.

The opening of contact members P1, Group III, deenergizes control relay Q, which thereafter functions to cause the slowing down and stopping of the car in the manner described in connection with the slowdown and stopping operation in the up direction. The only difference between the slowdown and stopping operation in the down direction and in the up direction being that in the latter case the contact members E1 and F1 of slowdown and stopping switches E and F function, while in the former case the contact members E2 and F2 of these switches function. The opening of the first floor hatchway door when the car reaches the first floor in response to closure of contact members Q6 and H5 in Group III is also as previously described.

After the car has been stopped at the first floor for a predetermined time, relay T times out. Contact members T1 prepare the door closing circuit in Group III, as previously described. Contact members T2 in Group IV are without effect, but contact members T3 in opening, Group IV, interrupt the circuit for stopping relay P. Closure of contact members T4, Group VI, jointly with the reclosure of contact members P5, completes a circuit for the resetting coil of the up first coil relay 1UR which thereupon assumes the deenergized position.

The resetting of up first floor relay 1UR is of no effect other than to complete a circuit for direction preference relay O through contact members 1UR3 in Group IV. Upon completion of this circuit, direction preference relay O again operates, but is without effect other than to prevent completion, by the opening of contact members O2 in Group III, of a circuit for control relay Q.

As a consequence of the stopping at the first floor, the system is restored to the same condition as prior to the registration of the previously described third floor up call. That is, direction preference relays N and O are energized, the door opening relay DO is energized, selecting switch S is again energized to give preference to car A, and the first floor zoning relay 1UZ is energized.

The response of car A to a down call is as follows: Assuming again that both cars are at the first floor and that a down hall call is registered by closing button 3DF, a circuit is completed in Group VI for the coil of floor relay 3DR. As previously described, the corresponding circuit in Group IX for the coil of relay B3DR is not completed, because selecting relay contact members S1 are open.

Relay 3DR, upon being operated, closes contacts 3DR1 and opens contacts 3DR2 and 3DR3 in Group IV, closes contact members 3DR4 in Group VI and opens contacts 3DR5 in Group IX.

Closure of contacts 3DR1, Group IV, is without immediate effect. Closure of contacts 3DR4, Group VI, completes a self-holding circuit for floor relay 3DR and lights down third floor lantern 3DL, thereby informing the intending passenger that his call has been registered and will be responded to by car A. The opening of contacts 3DR5 prevents operation, through button 3DF, of floor relay B3DR for car B.

The opening of contact members 3DR2 and 3DR3 interrupts the circuit for direction preference relay N. The remainder of the starting operation is as previously described in connection with the up call at the third floor.

As the car nears the second floor, switch V again operates to actuate first floor relay 1UR, the contact members of which function as previously described.

As the car approaches the third floor, brush *b* engages segment 3*b* and recompletes the circuit for direction preference relay N. Relay N operates, opening contact members N1 and N2 in Group III, opening contact members N3 and closing contact members N4 in Group IV, and closing contact members N5 in Group V.

The opening of contact members N1, Group III, is without effect. The opening of contact members N2 in Group III deenergizes control relay Q. The opening of contact members N3 in Group IV deenergizes direction preference relay O. The closure of contact members N4, Group IV, completes a circuit for down stopping relay P, which circuit also includes contact members M3, U8 and T3.

Relay Q, upon being deenergized causes the car to slow down and stop, in the manner previously described. In the course of this operation, relay T is deenergized, at which time contact members T1, T4 and T5 start to reclose and contact members T2 and T3 start to reopen.

Stopping relay P, upon being operated, opens contact members P1 in Group III; opens contact members P2 and closes contact members P3 and P4 in Group IV, and opens contacts P5 in Group VI.

The opening of contacts P1 prevents reenergization of control relay Q, Group III, by the reclosure of contact members O2, which results from the deenergization of relay O. Closure of contact members P3, Group IV, completes a holding circuit for direction preference relay N. This circuit remains complete until relay T times out and opens contact members T2. Closure of contact members P4 in Group IV completes a self-holding circuit for relay P which remains complete until the opening of contacts T3.

The opening of contact members P2 in Group IV, is without effect. The opening of contact members P5 in Group VI is without immediate effect.

Upon being deenergized, direction preference relay O closes contact members O1 and O2 in Group III, opens contacts O3 and closes contacts O4 in Group IV, and opens contacts O5 in Group V. Contact members O1, O2 and O3 are without effect in this instance. Contact members O4 complete a holding circuit for direction preference relay N. Contact members O5 are concerned with the zoning relays, the effect of which will be described later.

The deenergization of relay O, above described, establishes a down direction preference, which causes the next start of the car to be in the down direction.

After the car has remained at the third floor for a predetermined time, relay T times out, reclosing contacts T1 in Group III, opening contacts T2 and T3 in Group IV, and reclosing contacts T4 and T5 in Group VI.

Reclosure of contacts T4 in Group VI completes the resetting circuit for floor relay 3DR, which resumes the deenergized position, extinguishing the third floor down lantern 3DL. The opening of contact members T2 in Group IV is without effect, but the opening of contact members T3 deenergizes stopping-relay P. Reclosure of contact members T1 in Group III prepares the circuit for door closing relay DC.

Stopping relay P, upon being deenergized, recloses contact members P1 in Group III, energizing control relay Q. Relay Q, in turn completes the circuit for door closing relay DC (which closes the door and gate), and completes the circuit for down reversing switch D, which starts the car downwardly in the manner previously described. Relay P also recloses contact members P2 and reopens contact members P3 and P4 in Group IV, the operation of which is without effect at this time. As the car approaches the first floor, it is slowed down and stopped in the manner previously described.

The operation of the car in the event that a number of up and down calls are registered at the same time is as follows: Assuming again that the cars are at the first floor, and that up-hall calls are registered on buttons 2UF and 4UF, and that a down-hall call is registered on button 3DF, floor relays 2UR, 4UR and 3DR are operated to complete self-holding circuits, and light the corresponding floor lanterns, as shown in Group VI. The energizing circuits for these floor relays include contacts on the zoning relays, the action of which is described later.

The first of these floor relays to be energized deenergizes relay N in Group IV as previously described. As also previously described, relay N energizes relay Q in Group III, causing the door and gate to close and the car to start upwardly.

As the car approaches the second floor, brush *b* engages segment 2*b* completing a circuit for stopping relay M. Relay M in turn deenergizes relay Q in Group I, which results in the stopping of the car and the opening of the door and gate at the second floor.

As previously described, floor relay 1UR is energized through hatchway switch V in Group VI as the car approaches the second floor. While standing at the second floor, therefore, calls are registered for floors both above and below the car. Having started upwardly, however, up direction preference relay N is energized and contact members N3 complete a holding circuit for down direction preference relay O in Group IV. Relay N is maintained deenergized as long as there are calls above the car. Consequently, after having started upwardly, response is had to calls for floors above the car before response is had to calls for floors below the car.

After the car has remained at the second floor for a predetermined time, relay T times out, deenergizing stopping relay M, in Group IV, cancelling the second floor up call and extinguishing the second floor lantern 2DL in Group VI, in the manner previously described. The deenergization of relay M completes a circuit for starting relay Q, in Group III, which causes the closure of the doors and the starting of the car in the manner previously described.

As the car approaches the fourth floor, stopping relay M is again energized, deenergizing relay Q. Relay Q in turn causes the car to slow and stop, and the doors to open. After the car has remained at the fourth floor a predetermined time relay T times out, cancelling relay 4UR and extinguishing the lantern, in the manner previously described.

Under the conditions assumed, no calls are registered for floors above the fourth floor. If the fourth floor call had been a down call, the direction preference would have been reversed immediately, as described in connection with the stop for the third floor down call. In this case, however, the last stop was for an up call and the up direction preference (relay N) is maintained for a predetermined time after such stop. As previously described, the up direction preference is terminated when relay N is reenergized in response to the closure of contacts 4UR2 (Group IV). These contacts close when relay T times out and cancels the fourth floor up relay 4UR.

Assuming that no further calls are registered for floors above the car during the time that relay T is timing out, relay N is energized. The opening of contact members N3 (Group IV) deenergizes down direction preference relay O, since contact members 1UR2 and 1UR3 associated with the first floor call have interrupted the initial operating circuit for relay O.

Relay O, upon being deenergized, operates relay Q, (Group III), which causes the closure of the doors and the restarting of the car downwardly in a manner previously described.

As the car approaches the third floor, brush *c* engages segment 3*c* in Group IV, completing a circuit for the coil of stopping relay P. Relay P operates relay Q (Group III), which causes the slowing down and stopping of the car and the opening of the doors in the manner previously described.

At the expiration of the predetermined time, relay T times out, interrupting the previously completed self-holding circuit for relay P, Group IV, cancelling the third floor down call and extinguishing the third floor down lantern 3DL in Group VI. The deenergization of stopping relay P again energizes relay Q (Group III), which causes reclosure of the doors and the starting of the car downwardly as previously described.

Under the conditions mentioned, in which the car is caused to return to the lower terminal, response is never had to an up call during downward travel. If, however, throwover switch W is opened, in Group III, the departure of the car from the first floor does not result in the actuation of first floor relay 1UR. Under these conditions the car may be stopped in its downward movement in response to an up call, as follows:

Assuming, to continue the previous example, that after the car left the second floor travelling upwardly, an up call was registered at the second floor, relay 2UR (Group VI) is actuated. Contact members 2UR2 and 2UR3 in Group IV open in the circuit of down direction preference relay O accordingly, relay P is maintained, deenergized, and upon the timing out of relay T, after the last described stop, at the third floor, relay Q is energized (Group III), which results in the reclosure of the doors and the restarting of the car downwardly.

As the car approaches the second floor, brush *c* engages segment 2*c*, recompleting a circuit for down direction preference relay O, in Group IV. The opening of contact members O1 in Group III deenergizes control relay Q, which causes the slow down and stopping of the car and the opening of the door and gate in the manner previously described. Closure of contact members O3 completes a circuit for stopping relay M (Group IV), which also includes down reversing contact members D1, prior to the opening of these contact members. Relay M completes a self-holding circuit through contact members M2, which remains complete until the timing out of relay T. As long as this circuit is complete, the car cannot be restarted, as previously described.

The opening of contacts O4 deenergizes relay N, in Group IV, thereby establishing an up direction preference. Relay N remains deenergized until relay T times out, cancelling the second floor up relay 2UR, which results in the reclosure of contact members 2UR2 and 2UR3, in Group IV.

Any calls registered for floors above the second floor while relay T is timing out, following the just described stop at the second floor, further interrupt the circuit for the coil of up-direction-preference relay N. The starting of the car upwardly in response to these calls is, of course, delayed until relay T times out.

Any calls registered for floors below the second floor while relay T is timing out, following the just described stop at the second floor, have no immediate effect other than to actuate the corresponding floor relays in Group VI. When, however, relay T times out, cancelling the second floor up-call, relay N is again energized and opens contacts N3 in Group IV. This deenergizes down direction preference relay O, since floor relay contacts for floors below the position of the car, in this case, contacts 1UR2 and 1UR3, are open.

If no calls are registered, both direction preference relays N and O become energized when relay T times out, and remain so until a call is registered. When both direction preference relays are energized, the car may be started either upwardly or downwardly depending upon the position with respect to the car of the initial registered call, but remains at the floor corresponding to the last registered call, until the registration of such further call.

The response of a car to its car buttons is identical with the described response to hall buttons. Referring to Group VI, the car buttons 3C, 4C, etc., are connected substantially in parallel with the hall buttons, the only difference being that the car button circuits are independent of the zoning relays, later described, and that the car button circuits include the toggle switches 3*i*, 3*h*, etc. As mentioned in connection with the description of the floor selector, switches 2*i*, 3*i*, 4*i* and 5*i* are open except when the car is above the associated floor, and switches 1*h*, 2*h*, 3*h*, and 4*h* are open except when the car is below the associated floor.

Assuming, therefore, that car A is at the third floor, closure of the two sets of car push buttons marked 4C energizes up fourth floor relay 4UR, but does not energize down fourth floor relay 4DR, since switch 4*i* is open. Similarly, with car A at the third floor, closure of the two sets of car push button contacts marked 2C energizes down second floor relay 2DR, but does not energize up second floor relay 2UR, since toggle switch 2*h* is open under these conditions. It is believed obvious that the response of the car following the actuation of these floor relays is identical with the response thereto following operation of a hall button.

To summarize: With transfer switch W closed (Group VI), car A may be started in response to either hall or car buttons, will travel to the highest floor at which a call is registered, stopping successively for up calls on the way, and will then reverse and return to the lower terminal, stopping successively for any intermediate down calls which have been registered. If the highest floor stop is for an up call, the up direction preference is maintained for a predetermined period to permit registration of further calls for floors above the position of the car. If the stop at the highest floor is for a down call, the direction preference is reversed immediately and the restarting of the car is in the downward direction, even though further calls for higher floors may be registered before the car restarts.

If switch W (Group VI) is opened, the performance of car A is the same except that after having reached the farthest floor in a particular direction of travel, it will reverse only if calls for floors in the reverse direction remain unanswered. If no further calls remain, the car remains at the floor corresponding to the last registered call.

Since the individual control systems for all cars of a bank are identical, the performance of car B is the same as the described performance of car A.

*Operation of plurality of cars*

As previously mentioned, when two or more cars operate as a bank, any particular registered call is appropriated to, and causes the starting of only one of the cars, and response thereto by others of the cars is prevented. This selection between the several cars is accomplished by the zoning relays shown in Groups I, V, and VIII, and by the selecting relays shown in Group II.

As previously mentioned, each car of the bank is provided with a selecting relay, the relay for car A being designated S and the relay for car B being designated BS. A transfer switch is provided to connect either of these relays to an energizing circuit. This energizing circuit includes brushes *a* and B*a* for cars A and B, respectively, which are arranged to engage associated segments *1a*, *2a*, B*1a*, B*2a*, etc., respectively. As shown, the circuit for a selecting relay is complete only when both cars are standing at the same floor. Assuming selecting relay S is energized, it opens contact S*1* in Group IX, which prevents completion in response to a hall button of the circuit for any of the floor relays associated with car B. If selecting switch Y (Group II) is moved to the other illustrated position, selecting relay BS is energized when both cars are at the same floor, and opens contacts BS*1* in Group VI, preventing response to hall calls by the floor relays for car A.

The zoning system includes the common zoning relays *1*UZ, 2UZ, etc., shown in Group I, there being one such relay for each floor and for each direction of travel, and corresponding individual zoning relays for cars A and B shown in Groups V and VIII.

Referring particularly to Group V, with car A standing at the first floor and no calls registered, contacts O5 and N5 on the down and up direction preference relays O and N are closed. Brush *d* is in engagement with segment *1d*, so that relay *1*UY is energized. If a call is registered for a floor above the first floor, up direction preference relay N is deenergized, as previously mentioned, and starts the car upwardly. Contact members N5 also open so that during upward travel of the car, or as long as the up direction preference exists, none of the down zoning relays 2DY, 3DY, etc., are energized.

As car A leaves the first floor, brush *d* engages segment *2d*, energizing relay 2UY. Shortly thereafter, brush *d* disengages segment *1d*, deenergizing zoning relay *1*UY. The successive energization and deenergization of the remaining up zoning relays 3UY, 4UY, etc., is the same.

If car A reverses and starts downwardly, contact members O5 open and contact members N5 close as an incident to the reversal or the conditioning for reversal of car A, as previously described. This interrupts any previously completed circuit for an up zoning relay and completes the circuit for the down zoning relay for the floor at which the car is positioned.

It is seen, therefore, that with car A standing at any intermediate floor, conditioned to travel upwardly, a corresponding up zoning relay is energized. If it is conditioned to travel downwardly, a corresponding down zoning relay is energized. If no direction preference exists, both up and down zoning relays for the corresponding floor are energized. The zoning relays for car B shown in Group VIII operate in a corresponding manner.

Referring particularly to Group I, the zoning relays for the individual cars jointly control the common zoning relays *1*UZ, 2UZ, etc. Operation of any individual zoning relay energizes a corresponding common zoning relay *1*UZ, 2DZ, etc.

In addition to the contacts of the individual zoning relays shown in Group I, each of these relays is provided with contact members designated *1*UY2, 2UY2, etc. The additional contact members associated with the zoning relays individual to car A are shown in Group VI, and those associated with car B are shown in Group IX. Each of the common zoning relays shown in Group I is provided with a contact member for each car of the bank. The contact members *1*UZ*1*, 2UZ*1* of the common zoning relays are associated with car A and are shown in Group VI. The contact members *1*UZ2, 2UZ2, etc., are associated with car B and are shown in Group IX.

This zoning serves two purposes: First, it enables the immediate appropriation to a particular car of any hall call registered in the zone for that car; and, second, prevents response by any other car to such call. Since any registered call is immediately appropriated to a particular one of the cars, it is possible to immediately light the floor lantern for that car, corresponding to the floor and direction of the call.

In the examples thus far given, it has been assumed that all of the calls have been registered either while both cars A and B are standing at the lower terminal floor, in which case car A has been assumed to be the preferred car, or have been registered in the zone for car A; that is, that they were up calls in advance of the position of car A or were down calls. In both of these cases, car A responds to the calls, in the manner described.

Assuming, however, that after car A has been started upwardly in response to a call, an up call is registered for a floor which car A has passed, such call is appropriated to car B, and response thereto by car A is prevented. For example, if car A is at the third floor, conditioned to travel upwardly and car B is at the first floor, closure of up button 2UF completes a circuit in Group IX for up second floor relay B2UR, which extends from plus through contact members S*1*, B*1*UY2, 2UZ2, button 2UF, contact members 2UR5, and coil B2UR, to minus. Contact members B*1*UYZ and 2UZ2 are closed, since car B is at the first floor. Contact members 2UR5 are closed because second floor up relay 2UR, associated with car A is ineffective to respond to the second floor up call, under the conditions assumed, as follows:

Referring to Group VI, closure of button 2UF does not complete a circuit for coil 2UR, because with car A at the third floor conditioned to travel upwardly, contact members 3UY2 and 3UZ*1* are closed. Contact members 3UY2 form the only connection between the hall button circuits for car A and the plus line. Contact members 3UZ1 interrupt one connection between button 2UF and contact members 2UY2, and contact members 1UZ1 (open because car B is at the first floor) interrupt the other connection between button 2UF and contact members 3UY2. As shown, the latter connection also includes contact members 4UZ1, 5DZ1, 4DZ1, 3DZ1, 2DZ1, and 2UZ1, all of which are closed under the condition assumed.

The starting of car B in response to the second floor up call and the stopping of it at the second floor is as described in connection with car A, the control systems for the two cars being identical.

As car A proceeds up the hatchway, the zone in which up calls are appropriated to car B is correspondingly advanced. Assuming that car A reverses in the hatchway and starts down, the zone for car B, as to up calls, extends from the position of car B to the upper terminal, and as to down calls, from the upper terminal down to the position of car A.

For example, assuming car A is at the second floor conditioned to travel downwardly, and car B is at the lower terminal, any up calls for any of the floors and any down calls for either the fourth or fifth floors are appropriated to car B.

Assuming up calls are registered at the second and fourth floors, and down calls are registered at the fifth and third floors, relays B2UR, B4UR, B5DR and B3DR are energized (Group IX). The circuit for coil B2UR is as previously described. The circuit for coil B4UR extends as traced for coil B2UR, but continues through contact members 3UZ2 and 4UZ2, button 4UF, now closed contact members 4UR5 and coil B4UR. The circuit for coil B5DR continues from the just mentioned contacts 4UZ2 through contacts 5DZ2, button 5DF, now closed contacts 5DR5 and through coil B5DR. The circuit for coil B3DR continues from the just mentioned contacts 5DZ2 through contacts 4DZ2, and 3DZ2, button 3DF, now closed contacts 3DR5 and through coil B3DR.

It is believed apparent from the previous description that each of these registered calls immediately lights the corresponding floor lantern, and remain registered until answered, causing car B to stop successively at the second, fourth, fifth, and third floors. Assuming that switch BW (Group IX) is closed, so that the departure of car B from the first floor registered a lower terminal call, car B will, of course, return to the first floor after responding to the third floor down call.

The up calls at the second and fourth floors and the down calls at the fifth and third floors just mentioned are not registered upon car A, as shown in Group VI. Car A having been assumed to be at the second floor conditioned to travel downwardly, contact members 2DY2 and 2DZ1 are closed. Since car B is assumed to be at the first floor, contacts 1UZ1 are open. The contacts prevent completion through contacts 2DY2 of a circuit for any of the floor relays for car A except second floor down relay 2DR. It is believed obvious that had car A been assumed to be standing at the third floor, conditioned to travel downwardly, contacts 3DY2 would be closed and contacts 3DZ1 would be open. Contacts 3DYR would condition only the circuits for coils 3DR and 2DR. In this case, the third floor down call would not have been appropriated to car B, since as shown in Group IX, contacts 3DZ2 would be open preventing completion of the circuit for coil B3DR.

The third floor down call registered while car A was standing at the third floor would energize coil 3DR, and would be cancelled at the time car A left the third floor, by the closure of contact members T4 (Group VI), which, as previously described, occurs just before the starting of the car.

As long as car B stands at the first floor, the zone for car A, if it is conditioned to travel upwardly, includes all up hall calls above car A and all down calls; if car A is conditioned to travel downwardly, its zone includes only down calls for floors below it. If, however, car B has left the lower terminal travelling upwardly, the zone for car A includes all of the calls just mentioned and also includes any up calls between the lower terminal and the position of car B. For example, if car A is at the fourth floor conditioned to travel downwardly and car B is at the third floor conditioned to travel upwardly, the zone for car A includes down calls for the first and second floors. The zone for car B includes up calls for the third and fourth floors and a down call at the fifth floor.

Assuming with the car positions just mentioned that button 2UF is operated, coil 2UR is energized, the circuit extending from plus through contact members 4DY2, 3DZ1, 2DZ1, 1UZ1, 2UZ1, button 2UF, now closed contact members B2UR5 and coil 2UR. This call is not received by car B, since contact members 3UZ2 and 4DZ2 are open in Group IX. As previously described, assuming switch W (Group VI) is closed, to provide the lower terminal parking feature, car A would first proceed to the lower terminal and at the expiration of a predetermined time would restart and stop at the second floor. If switch W is open, and no first floor call is registered, car A would stop for the second floor up call during its downward movement.

In practice, it has been found that quite frequently car B, after having been started upwardly may respond to the highest call registered for it, reverse, and restart for the lower terminal from a floor below the position of car A. In this case, any calls previously appropriated to car A are answered by it.

Prior to reversal of car B, the zone for car B extends from the position of car B up to the position of car A, if the latter is conditioned to travel upwardly, or from the position of car B up to the upper terminal and back down to the position of car A, if the latter is conditioned to travel downwardly. The zone for car A includes the remainder of the hatchway. After reversal, the zone for car B extends from its position down to the lower terminal and back up to the position of car A, if the latter is conditioned to travel upwardly. If the latter is conditioned to travel downwardly, the zone for car B, after reversal, extends down to the lower terminal, back to the upper terminal and down to the position of car A.

Under such conditions, the zone for car A, if conditioned to travel upwardly, extends from its position to the upper terminal and back down to the position of car B. If car A is conditioned to travel downwardly, its zone extends from its position down to the position of car B.

As noted, although a reversal of car B such as just described revises the zones for the two cars, any call previously appropriated to a car are answered by it. Assuming that after the departure of car A from the first floor in response to a number of registered calls, including a down call at the second floor, car B is started upwardly, travels to the fourth floor, and reverses, assuming a position nearer the lower terminal than car A. It will be observed from the circuits in Group VI that the second floor down call is maintained on car A. This is because the floor relays, after having been energized, complete self-holding circuits which are independent of the zoning relays. For example the self-holding circuit for the second floor down relay 2DR is completed through contacts 2DR4. (Group VI.) The lantern circuit is similarly maintained. Further, should the second floor down button be again closed after the above-mentioned reversal, such reoperation would not register a call on car B, even though the zone for car B now includes down calls below the fourth floor. This is because operation of relay 2DR opens contacts 2DR5 in the circuit of relay B2DR, in Group IX. All of the floor relays of both cars A and B are provided with corresponding contacts, as shown in Groups VI and IX.

If one of the cars passes another of the cars travelling in the same direction, the zones of the two cars are immediately revised. The zone of the passing car then extending from its position to the next terminal, from that terminal to the next terminal and back to the position of the overtaken car. The zone of the overtaken car extends from its position to the position of the overtaking car.

Under these conditions, however, as previously mentioned, the contacts 1UR5, 2UR5, B1UR5, B2UR5, etc., of the floor relays maintain any registered calls and the corresponding lanterns lighted, and prevent response by the other car to the same call in the event the corresponding button should be reoperated after the revision in zones.

In the alternative embodiment, in which individual hall buttons are provided for each of the several cars of the bank, the present invention provides means to indicate to intending passengers at any floor which car of the bank is conditioned to respond to a call for that floor and direction. Illustrative circuits for accomplishing this are shown in Fig. 8.

Referring to this figure, each car is provided with an indicating element for each floor and each direction of travel. The up indicating elements for car A are designated 1UI, 2UI, 3UI, 4UI for the first through fourth floors, and the down indicating elements are designated as 2DI, 3DI, 4DI and 5DI for the second through fifth floors. The corresponding elements for car B are similarly designated but have the prefix "B".

As shown, the circuits for the indicating lights for both cars include contacts on the common zoning relays and on the individual zoning relays for the corresponding car. The operation of these common and individual zoning relays has been previously described. The indicating lamp circuits are also controlled by contact members on the selecting relays S2 and BS2 for cars A and B, respectively.

It is evident that with both cars standing at the same floor, and assuming that relay S is operated (Fig. 3 in Group II), none of the indicating lamps for car B will be illuminated. All of the indicating lamps for car A, however, will be illuminated, through circuits which include contacts on the individual zoning relay corresponding to the floor at which the car is standing, and parallel branches which include contacts 1UZ3, etc., of the common zoning relays (Fig. 8). Thus any intending passenger is informed that his call should be registered by pressing the hall button for car A.

If cars A and B are standing at different floors, the selecting relay contacts S2 and BS2 will both be closed, but in this case, the zoning relays determine which of the indicating lamps shall be lighted.

The zoning relay contacts in Fig. 8 function in the same manner as do the corresponding zoning relay contacts in Groups VI and IX. It is believed obvious from Fig. 8 that all of the indicating lamps for car A for floors in the zone for car A, and all of the indicating lamps for car B in the zone for car B are continuously illuminated.

The indicating lamps of Fig. 8 may be located adjacent the corresponding buttons, but are preferably incorporated in the push button structures. Fig. 9 shows an illustrative form of the preferred arrangement.

Referring to Fig. 9, a push button 25 of transparent material is supported in a housing 26, and is biased to the illustrated position by a coil spring 27, which surrounds button 25, and bears against shoulders 28 and 29.

Button 25 is hollow and accommodates an insert 30, having an angularly cut reflecting surface 31. Light from a source 32 passes through an aperture 33 in housing 26, is reflected from surface 31 and illuminates the end of button 25.

Button 25 and insert 30 are attached to a plate 34 which carries a stud 35. Stud 35 is disposed to actuate a contact making plunger 36 associated with any conventional form of manually closed switch 37.

The present invention may be practiced in many forms other than the one illustrated and described. The present embodiment is therefore to be considered in an illustrative and not a limiting sense.

I claim as my invention:

1. In a control system for an elevator car operable past a plurality of floor landings, push buttons for each of said landings, floor relays respectively associated with said push buttons, zoning relays comprising contacts respectively associated with each of said floors, means for successively actuating said zoning relays in accordance with the position of said car, circuit connections between said push buttons and said floor relays including contacts of said zoning relays, and control mechanism for said car comprising mechanism responsive to said floor relays for causing the card to start, travel to, and stop at the associated floor.

2. In a control system for an elevator car operable past a plurality of floor landings, push buttons for each of said landings, floor relays for each of said landings, circuit connections between corresponding floor relays and push buttons, zoning relays for each of said floors, each zoning relay comprising contacts, mechanism for successively actuating said zoning relays in accordance with the position of said car, circuits interconnecting said floor relay circuit connections, said interconnecting circuits including contacts of said zoning relays, and mechanism responsive to any of said floor relays for causing the car to start, travel to, and stop at the corresponding floor.

3. In a control system for a plurality of elevator cars operable past a plurality of floors, push buttons for each of said floors, floor relays individual to each car for each of said floors, zoning relays for each of said floors responsive to the positions of said cars, each zoning relay comprising contacts, circuit connections between said push buttons and said floor relays, said circuit connections comprising contacts of said zoning relays, and means responsive to any of said floor relays for causing the associated car to start, travel to, and stop at the corresponding floor.

4. In a control system for a plurality of elevator cars operable past a plurality of landings, floor relays for each of said landings individual to each of said cars, mechanism responsive to any floor relay for causing the associated car to start, travel to, and stop at the corresponding floor, push buttons for each of said landings common to said cars, for actuating said floor relays, and means for selecting which floor relay for a certain floor shall respond to the push button for the corresponding floor comprising zoning relays responsive to the positions of said cars.

5. In a control system for a plurality of elevator cars operable past a plurality of landings, floor relays for each of said landings individual to each of said cars, mechanism responsive to any floor relay for causing the associated car to start, travel to, and stop at the corresponding floor, push buttons for each of said landings common to said cars, for actuating said floor relays, and means for selecting which floor relay for a certain floor shall respond to the push button for the corresponding floor comprising zoning relays common to all of said cars and responsive to the positions of said cars.

6. In a control system for a plurality of elevator cars operable past a plurality of landings, floor relays for each of said landings individual to each of said cars, mechanism responsive to any floor relay for causing the associated car to start, travel to, and stop at the corresponding floor, push buttons for each of said landings common to said cars, for actuating said floor relay, and means for selecting which floor relay for a certain floor shall respond to the push button for the corresponding floor comprising zoning relays common to said cars, zoning relays individual to each car, and means responsive to the position of each car for actuating the common zoning relays and the individual zoning relays for the corresponding car.

7. In a control system for a plurality of elevator cars operable past a plurality of landings, floor relays for each of said landings individual to each of said cars, mechanism responsive to any floor relay for causing the associated car to start, travel to, and stop at the corresponding floor, push buttons for each of said landings common to said cars, for actuating said floor relay, zoning relays responsive to the positions of said cars for determining which floor relay for a certain floor shall respond to a corresponding push button when said cars are positioned at different floors, and additional mechanism for determining which floor relay for a certain floor shall respond to a corresponding push button when said cars are standing at the same floor.

8. In a control system for a plurality of elevator cars operable past a plurality of landings, floor relays for each of said landings individual to each of said cars, mechanism responsive to any floor relay for causing the associated car to start, travel to, and stop at the corresponding floor, push buttons for each of said landings common to said cars, for actuating said floor relay, zoning relays responsive to the positions of said cars for determining which floor relay for a certain floor shall respond to a corresponding push button when said cars are positioned at different floors, and additional mechanism for determining which floor relay for a certain floor shall respond to a corresponding push button when said cars are standing at the same floor, said additional mechanism comprising a relay and a circuit therefor completed when more than one of said cars are standing at the same floor.

9. In a control system for a plurality of cars operable past a plurality of landings, push buttons for each of said landings, means for each car responsive to any of said push buttons for causing the associated car to start, and means for preventing the starting of more than one of said cars in response to any push button comprising zoning relays for each of said floors responsive to the positions of said cars.

10. A control system for a plurality of elevator cars operable past a floor comprising control means for said floor; a relay individual to each of said cars associated with said floor and disposed to respond to said control means to cause the corresponding car to start; and selecting mechanism controlled in accordance with the positions of said cars for controlling the response of said relays to said control means.

11. A control system for a plurality of elevator cars operable past a plurality of floors comprising control means for each of said floors; mechanism effective, in the event more than one of said cars are at any one of said floors, to cause one of said more than one cars to start in response to a control for a second one of said floors; and mechanism rendered effective by the departure of said one car from said one floor to cause another of said more than one cars to start in response to a control for a third one of said floors.

12. A control system for an elevator car operable past a plurality of floors comprising a control for each of said floors, floor relays respectively associated with said controls for actuation thereby; zoning mechanism comprising contacts associated respectively with said floors for controlling the actuation of said relays by said controls, means for successively actuating said zoning contacts in accordance with the position of said car, and means responsive to any actuated floor relay for causing said car to start, travel to, and stop at the associated floor.

13. An elevator system for a plurality of elevator cars operating past a plurality of floors comprising means individual to each of said cars for each of said floors, zoning mechanism controlled in accordance with the positions of said cars for controlling the operation of said means when said cars are at different floors, and additional means cooperating with said zoning means for controlling the operation of said first named means when more than one of said cars are at the same floor.

14. An elevator system for a plurality of cars operable past a plurality of floors comprising means for said floors for registering calls for service, call receiving mechanism for each of said cars, zoning mechanism controlled in accordance with the positions of said cars for controlling the response of said call receiving mechanisms to said call means when said cars are at different floors; and additional means cooperating with said zoning means to control the response of said call receiving mechanism to said call means when more than one of said cars are at the same floor.

15. An elevator system for a plurality of elevator cars operable past a plurality of floors comprising a relay for each of said floors individual to each of said cars, means for operating said relays, and mechanism responsive to the positions of said cars and effective, in the event more than one of said cars are standing at the same one of said floors for preventing operation of the said relays for more than one of said more than one cars.

16. An elevator system for a plurality of elevator cars operable past a plurality of floors comprising a relay for each of said floors individual to each of said cars, means for operating said relays, and zoning mechanism, comprising means responsive to the positions of said cars for determining which relays for each car may be operated, and effective, in the event more than one of said cars are at the same one of said floors for preventing operation of the said relays for more than one of said more than one cars.

HAROLD W. WILLIAMS.